(12) United States Patent
Romanek et al.

(10) Patent No.: US 9,753,963 B2
(45) Date of Patent: Sep. 5, 2017

(54) SYSTEM AND METHOD FOR DETERMINING AN INDEX OF AN OBJECT IN A SEQUENCE OF OBJECTS

(71) Applicant: ADVANCED DIGITAL BROADCAST S.A., Chambesy (CH)

(72) Inventors: Adam Romanek, Zielona Gora (PL);
Tomasz Szajna, Zielona Gora (PL);
Adam Stolcenburg, Zielona Gora (PL);
Piotr Kobzda, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 346 days.

(21) Appl. No.: 14/607,141

(22) Filed: Jan. 28, 2015

(65) Prior Publication Data
US 2015/0213086 A1 Jul. 30, 2015

(30) Foreign Application Priority Data
Jan. 28, 2014 (EP) .................................... 14152780

(51) Int. Cl.
*G06F 17/30* (2006.01)
*H04L 12/64* (2006.01)

(52) U.S. Cl.
CPC .... *G06F 17/30336* (2013.01); *H04L 12/6418* (2013.01)

(58) Field of Classification Search
CPC ..................... G06F 17/30336; H04L 12/6418
See application file for complete search history.

(56) References Cited

U.S. PATENT DOCUMENTS

2007/0220114 A1  9/2007  Kaarela ............... H04L 12/2812
                                                        709/219

OTHER PUBLICATIONS

Lefty Levernz et al. Oracle 8I Concepts. Retrieved from the Internet <URL: https://docs.oracle.com/cd/A87860_01/doc/server.817/a76965.pdf>.

*Primary Examiner* — Etienne Leroux
*Assistant Examiner* — Husam T Samara
(74) *Attorney, Agent, or Firm* — Mark M. Friedman

(57) ABSTRACT

A method for determining an index of an object in a sequence of objects, the method comprising the steps of: obtaining a unique identifier value of a given object O; obtaining a query definition Q of a sequence, the Q query including an order definition according to a parameter of the O object; constructing a Q' query based on the Q query, the Q' query being different from the Q query by having a reversed ordering of results, with respect to the Q query, and providing results having said parameter value of objects preceding or matching the parameter value of the object O in the sequence of objects in the Q query result set; executing the Q' query by a query execution engine; checking whether the object O is present as the first item in Q' result set and in case it is, obtaining the index of the O object in Q sequence by retrieving objects count of the Q' result set.

11 Claims, 3 Drawing Sheets

Figure 1:
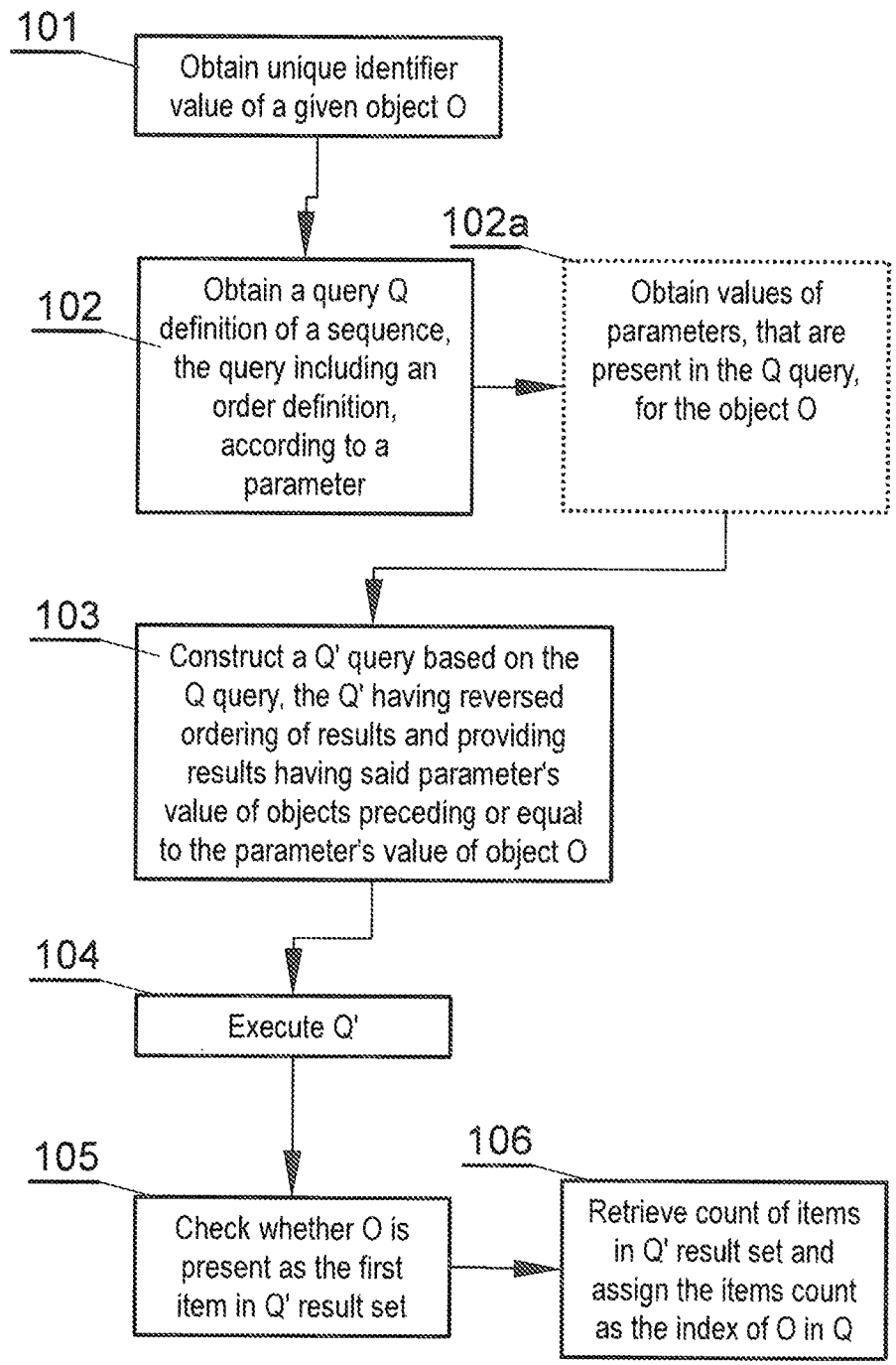

```
                    201                            202
                     ┌──────────────────────┐      ┌──────────────────────┐
                     │ Name:      Channel 1 │      │ Name:      Channel 3 │
                     │ ID:        23        │      │ ID:        25        │
                     │ Viewing Frequency: 10│      │ Viewing Frequency: 44│
                     ├──────────────────────┤  203 ├──────────────────────┤
                     │ Name:      Channel 2 │      │ Name:      Channel 4 │
                     │ ID:        14        │      │ ID:        3         │
                     │ Viewing Frequency: 1 │      │ Viewing Frequency: 32│
                     ├──────────────────────┤      ├──────────────────────┤
                     │ Name:      Channel 3 │      │ Name:      Channel 1 │
                     │ ID:        25        │      │ ID:        23        │
                     │ Viewing Frequency: 44│      │ Viewing Frequency: 10│
                     ├──────────────────────┤      ├──────────────────────┤
                     │ Name:      Channel 4 │      │ Name:      Channel 5 │
                     │ ID:        3         │      │ ID:        29        │
                     │ Viewing Frequency: 32│      │ Viewing Frequency: 9 │
                     ├──────────────────────┤      ├──────────────────────┤
                     │ Name:      Channel 5 │      │ Name:      Channel 2 │
                     │ ID:        29        │      │ ID:        14        │
                     │ Viewing Frequency: 9 │      │ Viewing Frequency: 1 │
                     └──────────────────────┘      └──────────────────────┘
```

204

SELECT * FROM CHANNELS
    ORDER BY "Viewing Frequency" DESC

205

SELECT * FROM CHANNELS
    WHERE "Viewing Frequency" >= 32 ORDER BY "Viewing Frequency" ASC

206

SELECT * FROM CHANNELS
    ORDER BY "Viewing Frequency" ASC

207

SELECT * FROM CHANNELS
    WHERE "Viewing Frequency" =< 32 ORDER BY "Viewing Frequency" DESC

Fig. 2

SYSTEM AND METHOD FOR DETERMINING AN INDEX OF AN OBJECT IN A SEQUENCE OF OBJECTS

The present invention relates to a system and method for determining an index of an object in a sequence of objects. Sequences of objects are typically available as a result of querying a source of data, such as a database, using a suitable query such as an SQL query, or UPnP (AKA DLNA) Content Directory Service (CDS) [ref: http://www.upnp.org/specs/av/UPnP-av-ContentDirectory-v1-Service.pdf] Search action.

There are frequently cases when a sequence of objects is available comprising a plurality of objects, which can be retrieved from the sequence. A query may specify search criteria determining which objects will be available in the query result and order criteria determining order of objects in the query result. For example, in relational databases a table is a container of records, that can be queried with SELECT statements, the search criteria are specified with a WHERE clause and the order criteria are specified with the ORDER BY clause. Another example is UPnP CDS Search action with accordingly specified SearchCriteria and SortCriteria.

A result of such a query is a sequence of objects. The objects may be considered to reside at consecutive, unique indexes (or otherwise unique identifiers or keys) in the sequence being a result set of a query. It is not relevant what is a format of the unique index as long as each object in the sequence has a different value of the index.

The query results are typically expressed by an iterator-like API, for example, SQL database cursor, or StartingIndex and RequestedCount pair in UPnP CDS Search action. Such approach provides a fragment of the query result sequence at a time, instead of the whole result objects set. This may improve transmission and storage performance. The iterator/fragment is related to an index in the sequence, at which an object (or number of objects) is provided.

In order to access objects from the sequence, that are not available at current iterator/fragment index, the iterator/fragment shall be moved to a new index. The index move operation may be time-consuming or asynchronous, thus iteration over the whole sequence is not a trivial task.

However, in many applications only a fragment of the query result sequence is under concern, what makes this approach a convenient and commonly used pattern.

It is frequently needed to determine an index of an object in a sequence for example in order to request the next object in the sequence. Typically databases do not include nested records that reference previous/next records. This approach would be inefficient because the previous/next references would have to be rebuilt with each ordering of the sequence.

Therefore, there exists a problem of efficient determination of an index of an object in a sequence of objects wherein the unique identifier of the object is known. Preferably, the solution shall determine whether the object exists in the sequence.

It would be thus desirable to provide an improved method for determining an index of an object in a sequence of objects.

The object of the present invention is a method for determining an index of an object in a sequence of objects, the method comprising the steps of: obtaining a unique identifier value of a given object O; obtaining a query definition Q of a sequence, the Q query including an order definition according to a parameter of the O object; constructing a Q' query based on the Q query, the Q' query being different from the Q query by having a reversed ordering of results, with respect to the Q query, and providing results having said parameter value of objects preceding or matching the parameter value of the object O in the sequence of objects in the Q query result set; executing the Q' query by a query execution engine; checking whether the object O is present as the first item in Q' result set and in case it is, obtaining the index of the O object in Q sequence by retrieving objects count of the Q' result set.

Preferably, the unique identifier value is a numerical value.

Advantageously, the identifier of the object and the parameter of order definition are the same properties of the object O.

Preferably, prior to constructing query Q', the values of parameters of the object O are obtained.

Preferably, if the query Q ordering is not strict, then query Q is replaced by query Q1 by the additional order criteria that makes Q1 ordering strict.

Preferably, the additional order criteria, in said Q1 query, refer to unique identifiers of objects.

Advantageously, the executed query Q' is constructed in such a way, that the retrieval of the total count of the Q' results utilizes the already available results.

Preferably, the query is executed in an SQL database.
Preferably, the query is executed in a UPnP CDS.

Another object of the present invention is a computer program comprising program code means for performing all the steps of the method according to the present invention when said program is run on a computer.

Another object of the present invention is a computer readable medium storing computer-executable instructions performing all the steps of the method according to the present invention when executed on a computer.

Yet another object of the present invention is a system for determining an index of an object in a sequence of objects, the system comprising: an object O register configured to store a unique identifier value of a given object O; a source query Q register configured to store a query definition Q of a sequence, the Q query including an order definition according to a parameter of the O object; a destination query register configured to store a newly constructed Q' query based on the Q query; wherein a source query order inverter is configured to reverse ordering of results, with respect to the Q query; a controller configured to obtain the output of the source query order inverter and define the Q' query, the Q' query being different from the Q query by, providing results having parameter's value of objects preceding or matching the parameter value of the object O in the sequence of objects in the Q query result set; the controller being further configured to: request execution of the Q' query by a query execution engine and check whether the object O is present as the first item in Q' result set and if it is, obtain the index of the O object in Q sequence by retrieving objects count of Q' result set.

Figure 3:
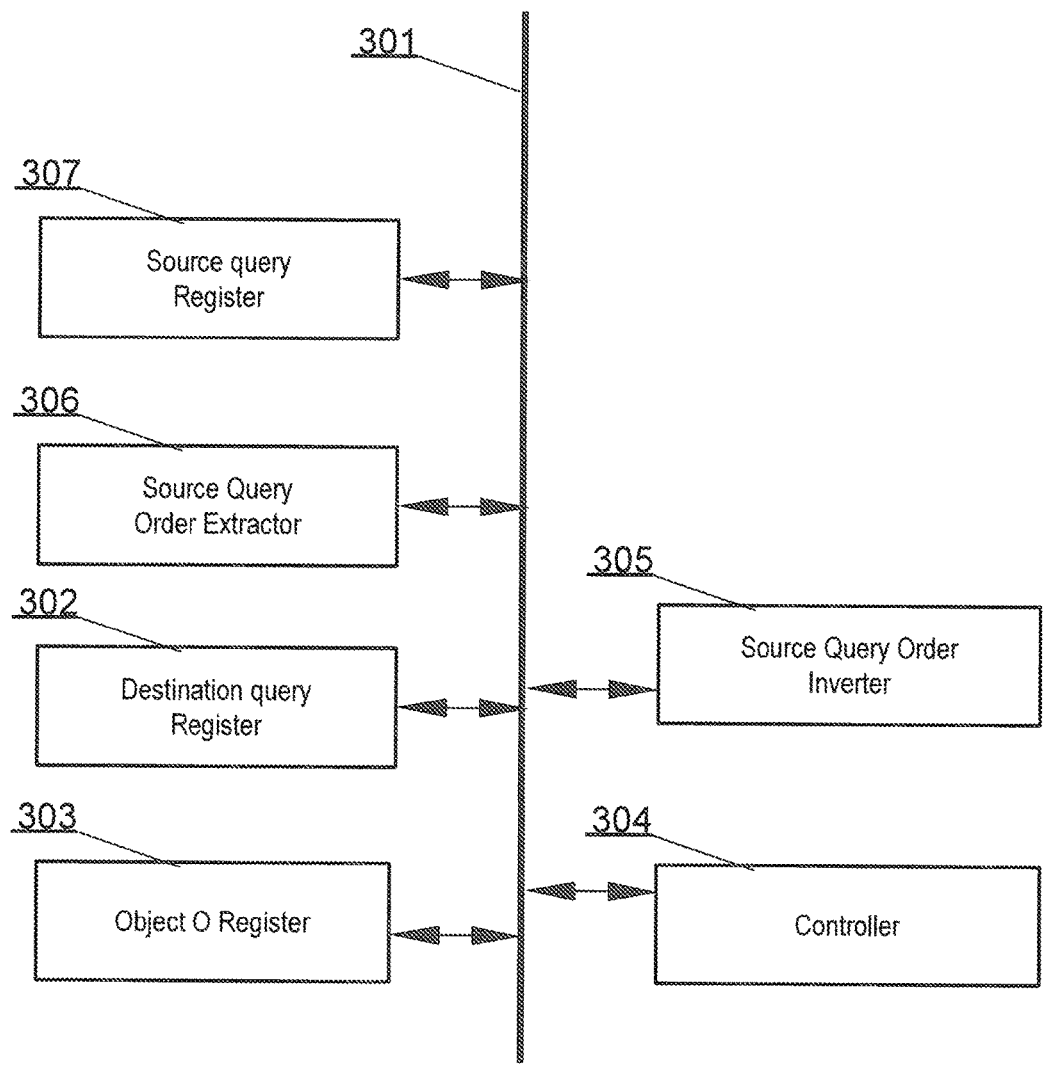

The present invention is shown by means of exemplary embodiments on a drawing, in which:
FIG. 1 presents a method according to the present invention;
FIG. 2 presents an example of a use of the method according to the present invention; and
FIG. 3 presents a system according to the present invention.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

According to the present invention it is assumed that identity of an object O is known a'priori. The identity may refer to some unique identifier or a primary key of the object. In database structures (typically tables) a unique key or primary key is a key that uniquely defines the characteristics of each row. The primary key has to consist of characteristics that cannot collectively be duplicated by any other row. In UPnP CDS the identity is defined by means of ObjectID.

Nevertheless, all properties of the object O are not necessarily known a'priori.

There is also an assumption that a query Q definition (parameters) is known a'priori. This query may be defined by a user of the system. As already indicated, another assumption is that the order of objects in the query result sequence is deterministic, that is the query Q order criteria are defined in the way, that the order is strict.

A query result representing a sequence is a finite sequence and its cardinality is easily available. For example, in case of an SQL Database together with each record data, an additional count column (count(*) in SQL) may be added. For another example, in case of UPnP CDS Search action the TotalMatches provides information on the sequence cardinality. Note, that the cardinality information is typically provided as a part of each Search action result.

The problem is to determine if a given object O can be found in the result sequence of a given query Q. A more specific problem is to determine an index of the object O in the result sequence of the query Q, or tell that such index does not exist.

A solution of the present invention is to construct a query Q', the Q' query being different from the Q query in that: (a) If an object is in results sequence of Q', then it is in result sequence of Q, (b) Only objects that compares less than or equal to O are in results of Q' and (c) Q' order is the reverted order of Q. Less than or equal means preceding or matching O in the sequence of objects in Q result set.

The result of the above is that if the object Q is in the results sequence of Q', then it is the first element in this sequence (thus may be easily obtained, without iteration). Hence, only this single first element of Q' results has to be checked to solve the problem. Further, if the object O is in the results set of the Q query, then its index, in the Q query results sequence, is equal to total size of results sequence of the Q' query (starting from index 1).

If the Q query order is not strict (there can exist objects with random order in results sequence), then the above solution cannot be applied directly. However, the Q query may be easily changed to some Q1 query in order to provide a strict ordering by adding appropriate secondary order criteria, that is by the objects' identity (that may be any unique key, including the aforementioned primary key).

The queries Q' for the Q queries may be constructed automatically with an analysis of its search criteria and order criteria: The Q' order criteria are the reverted Q query order criteria, and the Q' query search criteria may be constructed as Q query search criteria AND <condition, that objects precede or equal the object O>. The reverted order criteria means, that each ascending order parameter Pi in Q becomes descending order parameter Pi in Q', and each descending order parameter Pi in Q becomes ascending order parameter Pi in Q'.

The condition that objects precede or equal the O object with the respect to the Q query order) may be automatically established from the Q query order criteria. In an exemplary embodiment, the following procedure may be applied for this purpose.

Let the Q query be ordered by P1 ... Pn parameters, where P1 is a parameter of the primary ordering criterion, the P2 is a parameter of the secondary ordering criterion and so on. Let O.Pi denote the value of parameter Pi of the object O. The condition that the object precedes or equals O, with respect to parameters Pi ... Pn, may be expressed in a recursive way as a Ci condition such that:

Ci: Pi<O.Pi OR (Pi=O.Pi AND Ci+1)–when i<=n and Pi order is ascending;

Ci: Pi>O.Pi OR (Pi=O.Pi AND Ci+1)–when i<=n and Pi order is descending; and

Ci: TRUE—otherwise (when i=n+1).

Thus the C1 is the desired condition that an object precedes or equals O with respect to Q ordering criteria.

Example: In SQL the query Q specification may look like: "SELECT*FROM aTable WHERE foo<=10 ORDER BY bar ASC, baz DESC" and the object O properties have values {foo: 7, bar: 4, baz: 70}, Then the specification of Q' would be: "SELECT*FROM aTable WHERE (foo<=10) AND (bar<4 OR (bar=4 AND (baz>70 OR (baz=70 AND TRUE)))) ORDER BY bar DESC, baz ASC". Equivalent example for UPnP CDS can easily be constructed.

FIG. 1 presents a method according to the present invention. The procedure starts at step 101 from obtaining a unique identifier value of a given object. Typically, such an identifier will be a numerical value such as an integer value. Subsequently, at step 102, there is obtained a query definition (The Q query as explained previously) of a sequence, the query including an order definition according to a parameter of the O object. For the sake of completeness, it is irrelevant whether step 102 is executed after or before or in parallel to step 101.

Next, at step 102a, values of parameters that are present in the query definition from step 102, are obtained for the object O, preferably with a use of the unique identifier, from step 101, of this object O. If the values for the object O of the parameters from step 102 are known a'priori, then the step 102a may be omitted.

It is to be noted that the identifier of the object O and the parameter of order definition may be the same properties of the object O, such as, for example, they refer to the same column of a database table.

Next, at step 103, there is constructed a Q' query based on the Q query, the Q' having reversed ordering of results, with respect to the Q query, and providing results having said parameter's value of objects less than or equal to the parameter's value of the object O. Less than or equal means preceding or matching the O in the sequence of objects in Q query result set. The parameters values obtained in step 102a may be used to complete the Q' query definition.

For example, if the Q query result set shall have an ascending order on Column1 values, the Q' query shall have a descending order on Column1 values. Additionally, the Q' query requires a condition that the identifier's value is equal or less than (Less than or equal here means preceding or matching the O in the sequence of objects in the Q query result set) than the value of the object O identifier's value. In case the Q query has a descending order, the Q' lists all objects having the selected parameter greater than or equal (Greater than or equal here means preceding or matching O in the sequence of objects in the Q query result set) than the value of the object O parameter's value (eg. identifier).

Subsequently, at step 104, there is executed (by a query execution engine such as a database server engine) the Q' query followed by step 105 of checking whether the object O is present as the first item in Q' query result set. If it is, the index of the O object in the Q query sequence is obtained at step 106 by counting (or retrieving the count of) items in the Q' query result set and subsequently assigning the items count as the index of the object O in the Q query result set. Preferably, the retrieval of the total count of the Q' results (106) utilizes the already available results.

FIG. 2 presents an example of a use of the method according to the present invention. The example concerns a list of television channels 201 that may be sorted using different criteria. In this example each television channel comprises a name, an identifier and a viewing frequency (the higher the value the frequently the channel is viewed). It is to be understood that many different additional channel parameters may be present such as a genre, a parental rating, a current content type and similar.

While the user operates a television set or a television signal decoder or a tablet or the like, the user may set channels order according to a descending order of viewing frequency parameter, as shown in 202. Subsequently, on the 202 list the user may set channel "Channel 4" as the currently selected channel for viewing 203.

In such a case the query Q 204 is defined as: SELECT*FROM CHANNELS ORDER BY "Viewing Frequency" DESC. In turn, the Q' query 205 is defined as: SELECT*FROM CHANNELS WHERE "Viewing Frequency">=32 ORDER BY "Viewing Frequency" ASC.

The order of the Q query is reversed in the Q' query and a parameter is added based on the properties of the current channel 203 namely "Viewing Frequency" being>=32 defining values preceding the O in the original Q query. The final result of the 205 query is that the object O is present in the Q' query result set and the index of the O in the result set of the Q query is 2 (1 being the first index value).

In case where the query Q 206 is defined as: SELECT*FROM CHANNELS ORDER BY "Viewing Frequency" ASC, the Q' query 207 is defined as: SELECT*FROM CHANNELS WHERE "Viewing Frequency"=<32 ORDER BY "Viewing Frequency" DESC. The order of Q is reversed in Q' and a parameter is added based on the properties of the current channel 203 namely "Viewing Frequency" being=<32 defining values preceding O in the original Q query. The final result of the 207 query is that the object O is present in the Q' query result set and the index of the O object in the result set of the Q is 4 (1 being the first index value).

Therefore, a selection between ">" and "<" depends on the sorting order in the Q result set sequence since the result set of Q' is to list all objects preceding the O object in the sequence of Q result set, while discarding these following O.

In case the O object is in the Q' query result set it will be the first object and the number of objects in the Q' result set will determine the index of the O in the result set of the Q query.

FIG. 3 presents a system according to the present invention. If implemented in hardware, as in an alternative embodiment, the present system can be implemented with any suitable combination of discrete logic circuits having logic gates for implementing logic functions upon data signals, such as an application specific integrated circuit (ASIC) having appropriate logic gates, a programmable gate array(s) (PGA) or a field programmable gate array (FPGA), etc.

The system comprises a data bus 301, that may communicate internal as well as external modules. For example, an external module may input a source query Q in a source query register 307 and input object O data in an object O register 303.

The controller 304 is configured to communicate the query Q, present in the source query register 307, to a source query order extractor 306 that reports to the controller 304 information defining sorting order present in the Q query. Subsequently, the controller 304 communicates with a source query order inverter in order to invert the order of the query stored in the source query register 307.

The controller 304 is configured to communicate with the object O register 303 in order to extract the value of the object O of the parameter used in the sorting process, that is the value of 32 of "viewing frequency: as shown in FIG. 2 example. Once the controller is in possession of the input query, the inverted query order and the value of the parameter of the object O, the controller 304 outputs, to a destination query register a Q' query taking into account an appropriate use of "<" or ">" parameters as explained with reference to FIGS. 1 and 2.

The controller 304 is further configured to request execution 104 of the Q' query by a query execution engine and to check 105 whether the object O is present as the first item in the Q' query result set and if it is, to obtain the index of the O object in the Q sequence 106 by retrieving objects count of the Q' result set.

The controller 304 may further comprise an internal memory for storing computer software that provides instructions for the controller. The instructions for the controller allow for execution of the method according to the present invention.

It can be easily recognized, by one skilled in the art, that the aforementioned method for determining an index of an object in a sequence of objects may be performed and/or controlled by one or more computer programs. Such computer programs are typically executed by utilizing the computing resources of the device. The computer programs can be stored in a non-volatile memory, for example a flash memory or in a volatile memory (or otherwise a non-transitory computer readable medium), for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims in envisaged in the present application.

The invention claimed is:

1. A method for determining an index of an object in a sequence of objects forming a result set of a computer database query, the method comprising the steps of:
   obtaining a unique identifier value of a given object O;
   obtaining a query definition Q of a sequence, the Q query including an order definition according to a parameter of the O object;
   constructing a Q' query based on the Q query, the Q' query being different from the Q query by having a reversed ordering of results, with respect to the Q query, and providing results having said parameter value of objects preceding or matching the parameter value of the object O in the sequence of objects in the Q query result set;
   executing the Q' query by a query execution engine;
   checking whether the object O is present as the first item in Q' result set and in case it is, obtaining the index of the O object in Q sequence by retrieving objects count of the Q' result set.

2. The method according to claim 1 characterized in that the unique identifier value is a numerical value.

3. The method according to claim 1 characterized in that the identifier of the object and the parameter of order definition are the same properties of the object O.

4. The method according to claim 1 characterized in that prior to constructing query Q', the values of parameters of the object O are obtained.

5. The method according to claim 1 characterized in that if the query Q ordering is not strict, then query Q is replaced by query Q1 by the additional order criteria that makes Q1 ordering strict.

6. The method according to claim 5 characterized in that the additional order criteria, in said Q1 query, refer to unique identifiers of objects.

7. The method according to claim 1 characterized in that the executed query Q' is constructed in such a way, that the retrieval of the total count of the Q' results utilizes the already available results.

8. The method according to claim 1 characterized in that the query is executed in an SQL database.

9. The method according to claim 1 characterized in that the query is executed in a UPnP CDS.

10. A non-transitory computer-readable storage medium having embedded thereon computer-readable code for determining an index of an object in a sequence of objects forming a result set of a computer database query, the computer-readable code comprising program code for:
    obtaining a unique identifier value of a given object O;
    obtaining a query definition Q of a sequence, the Q query including an order definition according to a parameter of the O object;
    constructing a Q' query based on the Q query, the Q' query being different from the Q query by having a reversed ordering of results, with respect to the Q query, and providing results having said parameter value of objects preceeding or matching the parameter value of the object O in the sequence of objects in the Q query result set;
    executing the Q' query by a query execution engine;
    checking whether the object O is present as the first item in Q' result set and in case it is, obtaining the index of the O object in Q sequence by retrieving objects count of the Q' result set.

11. A system for determining an index of an object in a sequence of objects forming a result set of a computer database query, the system comprising:
    an object O register configured to store a unique identifier value of a given object O;
    a source query Q register configured to store a query definition Q of a sequence, the Q query including an order definition according to a parameter of the O object;
    a destination query register configured to store a newly constructed Q' query based on the Q query;
    wherein a source query order inverter is configured to reverse ordering of results, with respect to the Q query;
    a controller configured to obtain the output of the source query order inverter and define the Q' query, the Q' query being different from the Q query by, providing results having parameter's value of objects preceding or matching the parameter value of the object O in the sequence of objects in the Q query result set;
    the controller being further configured to: request execution of the Q' query by a query execution engine and check whether the object O is present as the first item in Q' result set, and if it is, "obtain the index of the O object in Q sequence by retrieving objects count of Q' result set.

* * * * *